United States Patent
Menssen

(10) Patent No.: US 8,657,900 B2
(45) Date of Patent: Feb. 25, 2014

(54) FILTER DEVICE AND MAIN FILTER ELEMENT FOR A FILTER DEVICE

(75) Inventor: Joerg Menssen, Tamm (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/445,835

(22) Filed: Apr. 12, 2012

(65) Prior Publication Data

US 2012/0198802 A1 Aug. 9, 2012

Related U.S. Application Data

(63) Continuation of application No. PCT/EP2010/064980, filed on Oct. 7, 2010.

(30) Foreign Application Priority Data

Oct. 12, 2009 (DE) .......................... 10 2009 049 170
Apr. 8, 2010 (DE) .......................... 10 2010 014 277

(51) Int. Cl.
*B01D 50/00* (2006.01)

(52) U.S. Cl.
USPC .................. 55/337; 55/484; 55/489; 55/500; 55/498; 55/497; 55/490; 55/344; 55/493; 55/499; 55/502; 55/521; 55/385.3; 55/478; 55/481; 123/198 E

(58) Field of Classification Search
USPC ........... 55/484, 489, 500, 498, 337, 497, 490, 55/344, 493, 499, 502, 521, 385.3, 478, 55/481; 123/198 E
See application file for complete search history.

(56) References Cited

U.S. PATENT DOCUMENTS

| 6,231,630 | B1 | 5/2001 | Ernst et al. | |
|---|---|---|---|---|
| 8,409,317 | B2 * | 4/2013 | Bannister | 55/503 |
| 2005/0028499 | A1 | 2/2005 | Greif et al. | |
| 2007/0289265 | A1 | 12/2007 | Coulonvaux | |
| 2010/0313533 | A1 | 12/2010 | Muenkel | |
| 2011/0083409 | A1 * | 4/2011 | Bannister | 55/502 |

FOREIGN PATENT DOCUMENTS

| DE | 29819335 U1 | 4/1999 |
|---|---|---|
| DE | 19849089 A1 | 4/2000 |
| DE | 10330296 A1 | 2/2005 |
| DE | 102008011186 A1 | 9/2009 |
| WO | WO03095068 A1 | 11/2003 |
| WO | WO2009106591 A2 | 9/2009 |

OTHER PUBLICATIONS

PCT International Search report of parent application PCT/EP2010/064980 to which priority is claimed.

* cited by examiner

*Primary Examiner* — Dung H Bui
(74) *Attorney, Agent, or Firm* — James Hasselbeck

(57) ABSTRACT

A two stage filter device includes a cyclonic pre-separator (10) designed as a pre-filter that separates the particles from the gas flow and a main filter element (20) arranged downstream as a second stage operable to filter by guiding the particles through at least one filter medium (24). The main filter element (20) is received in a filter housing (30). The main filter element (20) includes at least one retaining element (22) for stabilizing the position of the main filter element (20) in the housing (30).

14 Claims, 7 Drawing Sheets

FILTER DEVICE AND MAIN FILTER ELEMENT FOR A FILTER DEVICE

CROSS REFERENCE TO RELATED APPLICATIONS

This application is a US Bypass Continuation Application of International Application No. PCT/EP2010/064980 having a filing date of Oct. 7, 2010 and designating the United States, the International Application claiming a priority date of Oct. 12, 2009 based on prior filed German patent application No. 10 2009 049 170.8 and a priority date of Apr. 8, 2010 based on prior filed German patent application No. 10 2010 014 277.8. The entire contents of the aforesaid international application PCT/EP2010/064980 and the aforesaid German patent applications 10 2009 049 170.8 and 10 2010 014 277.8 being incorporated herein by reference.

TECHNICAL FIELD

This disclosure relates generally to a filter device that is in particular of a two-stage configuration for separating liquid and/or solid particles out of a gas stream to be purified, in particular a two-stage air filter for an internal combustion engine.

BACKGROUND OF THE INVENTION

A filter device according is disclosed in publication DE 10 2008 011 186 A1. Moreover, an air filter of the aforementioned kind for an internal combustion engine is disclosed in publication DE 298 19 335 U1. In the known filter elements, the main filter element is received with play in the filter housing.

SUMMARY OF THE INVENTION

The invention has the object to further develop a filter element of the aforementioned kind such that the main filter element is arranged so as to be immobile within the filter housing and that in particular the filter element is prevented from falling out of the filter device when mounted overhead.

This object is solved by a filter device with the features disclosed in claim 1. Advantageous embodiments and expedient further developments of the present invention are defined in the dependent claims.

Accordingly, the present invention is based on the main filter element or primary element having at least one retaining element that stabilizes the position of the main filter element in the filter housing. This retaining element extends, beginning at a circumferential side of the main filter element, in the direction toward the filter housing and is configured to position the main filter element at a defined spacing relative to the filter housing. The retaining element prevents thus that the main filter element moves within the filter housing.

Preferably, the main filter element has four retaining elements arranged on the respective circumferential sides wherein two of these retaining elements, respectively, are substantially positioned opposite each other or are positioned obliquely opposite each other.

In addition to stabilization of the main filter element in the filter housing, the retaining element can also serve to prevent the main filter element from undesirably falling out of the filter housing, for example, when opening the filter housing. For this purpose, the filter housing has at least one projection, beginning at the circumferential side of the filter housing and extending in the direction toward the main filter housing, that supports the retaining element and prevents the main filter element from falling out of the filter housing by itself.

In order for the main filter element to be insertable into the filter housing or removable therefrom in a simple way, the retaining element is preferably made of elastic material, for example, polyurethane. Accordingly, the retaining element can be moved, for example, with somewhat increased force expenditure, across the projection of the filter housing.

In one embodiment, the filter housing is provided at the inflow side with a front attachment wherein the front attachment is a cyclone preseparator, a protective screen, an induction pipe, or a raw air conduit.

In an advantageous embodiment, the cyclone preseparator comprises several individual cyclones. Such a multi-cell cyclone or multi-cyclone that is provided for prepurifying the gas stream with a plurality of guide vanes that cause the gas stream to rotate, is disclosed, for example, in the publication DE 10 2008 011 186 A1. In this connection, the cyclone preseparator, as is disclosed in the publication DE 103 30 296 A1, can be embodied as a two-stage preseparator.

As a main filter element or primary element that is received in the filter housing, for example, a compact air filter with a plurality of passages that are closed off alternatingly in the area of the inlet-side and outlet-side end surfaces and that are formed by placing a flat layer and a corrugated layer on each other is conceivable in which the gas stream is guided linearly through the filter passages. Alternatively, a single or multi-bellows filter with annularly closed, zigzag-folded filter bellows, preferably a double bellows filter with a larger annular filter element arranged about a smaller annular filter element, or a zigzag-folded planar filter element can be used.

The filter medium is preferably substantially annular or oval. For example, as described in the publication DE 10 2008 011 186 A1, in case of the multi-bellows filter each filter bellows can be embodied as a star filter with filter folds that are arranged in a star shape and at the inflow side and/or at the outflow side are tacked together. It is particularly advantageous when the end face edges of the filter folds are tacked together at the inflow side and/or at the outflow side, for example, by means of a so-called end face bonding.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
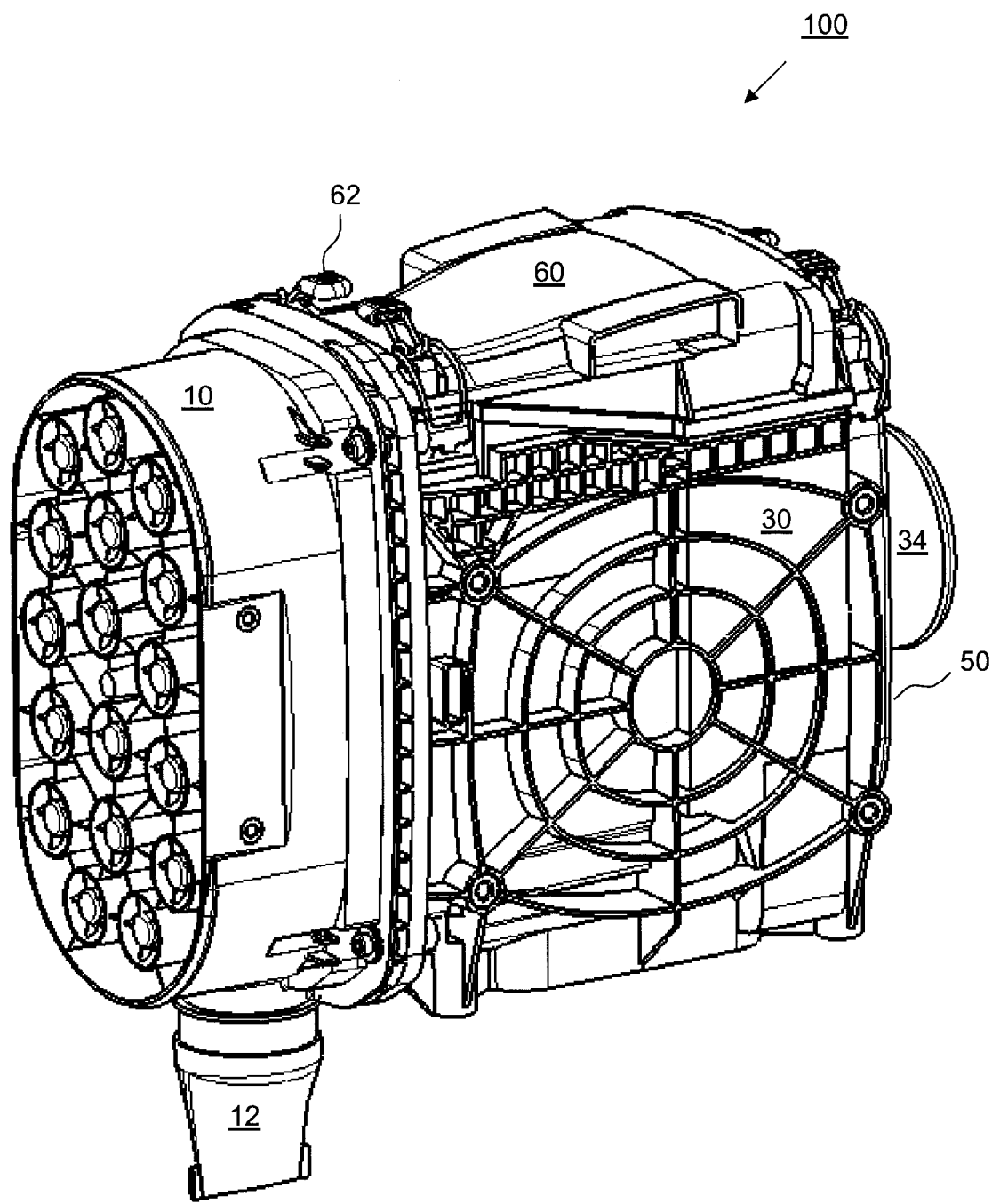
FIG. 1 shows in perspective illustration an embodiment for a two-stage filter device according to the present invention.

Same or similar configurations, elements or features are provided in FIGS. 1 to 8 with identical reference numerals. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter device and to a filter element for a filter device, as disclosed and enabled herein. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The two-stage filter device or two-stage separator 100 illustrated in FIG. 1 is an air filter for an internal combustion engine. This air filter 100 is comprised of a filter housing 30 in which a main filter element 20, a so-called primary element, is received; a cyclone preseparator 10; as well as a downstream secondary element 50. The gas stream that is passed through the air filter 100 is purified in a first filter stage in the cyclone preseparator 10 and in a second filter stage in the main filter element 20. The secondary element 50 prevents that when exchanging the main filter element 20 dirt can pass into the internal combustion engine.

The filter housing 30 has at its circumferential side an opening 36 that is covered by a cover 60 that is arranged to be detachable and lockable by means of closure element 62. By means of this opening 36 in the wall surface of the filter housing 30, the main filter element 20 and expediently also the secondary element 50 can be inserted radially or transverse to the axial direction of the filter device 100 into the receiving space within the filter housing 30 or removed therefrom. The filter housing 30 has a raw-side inlet 32 and a clean-side outlet 34 for the gas stream to be purified.

The cyclone preseparator 10 is arranged in the area of the inlet 32 of the filter housing 30. In the cyclone preseparator 10 the dirt particles of the axially supplied air are carried by centrifugal force in a rotating air stream outwardly and separated. By means of particle outlet 12 that can be oriented in downward direction, the dirt particles that have been separated in the cyclone preseparator 10 can be removed. The cyclone preseparator 10 is embodied as a separate component that is connected with the filter housing 30. The fluid that has been prefiltered in cyclone preseparator 10 is axially supplied to the inflow side at the end face of the filter element in axial direction. Cyclone preseparator 10, main filter element 20, and secondary element 50 can be positioned in axial direction behind each other and can be flowed through in axial direction in particular without deflection of the combustion air to be purified. Passage without deflection can be achieved, for example, when compact air filter elements are employed that have alternatingly closed passages in the main flow direction.

Figure 2:
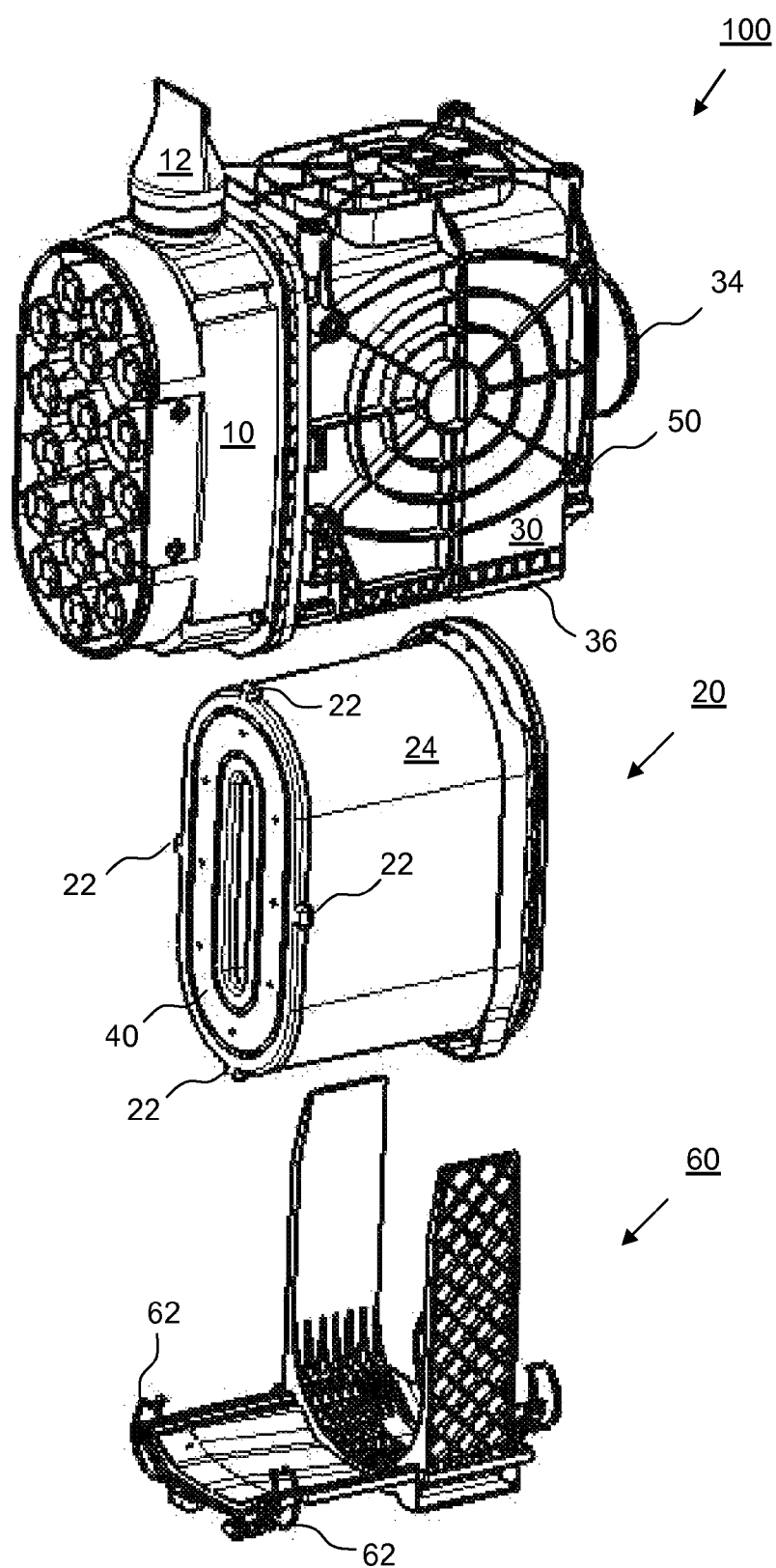
FIG. 2 shows in an exploded illustration the filter device of FIG. 1, wherein the filter housing, the cover of the filter housing, and the main filter element are individually illustrated.
Figure 7:
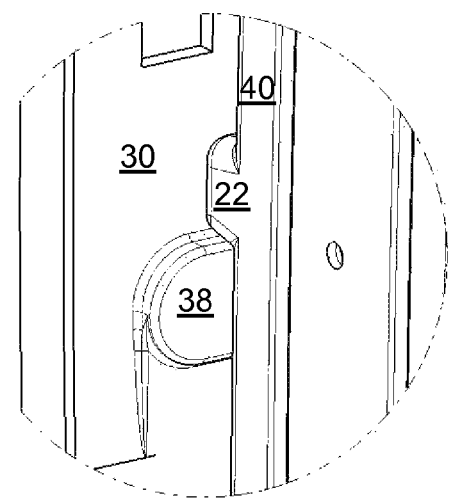
FIG. 7 shows a detail view of one of the retaining elements of FIG. 6 resting on the projections of the filter housing.

FIG. 2 shows the filter device 100 of FIG. 1 wherein the cover 60 and the main filter element 20 have been removed. The main filter element 20 has at its side that is facing the raw-side inlet 32 of the filter housing 30 an inflow-side sealing element 40 that is embodied for producing a gas-tight connection between two annular, zigzag-folded filter bellows of the main filter element 20 that are arranged within each other. This inflow-side sealing element 40 is preferably made of elastic material, for example, of polyurethane and has at its circumferential sides retaining elements, i.e., polyurethane knobs or spacer knobs 22 that secure the main filter element 20 mounted in the filter housing 30 at a defined spacing relative to the filter housing 30 (compare FIGS. 3 and 4, wherein FIG. 4 shows a detail view of the area that is encircled in FIG. 3 by dashed lines). Moreover, the polyurethane knobs 22 when opening the cover 30 of the filter housing 30 serve as a protection that protects by knobs the main filter element 22 from falling out. As shown in the FIGS. 5 to 7 (FIG. 7 shows a detail view of the area that is encircled in FIG. 5 by dashed lines), the polyurethane knobs 22, with the cover 60 open, interact with projections 38 of the filter housing 30 and secure the main filter element 20 in the filter housing 30. Since the lateral polyurethane knobs 22 are resting on the projections 38 of the filter housing 30, they prevent the main filter element 20 from falling out by itself. As a result of the elasticity of the polyurethane knobs 22, the main filter element 20 can still be pulled out at increased force expenditure from the filter housing 30. In this connection, the polyurethane knobs 22 are compressed and glide across the projections 38.

Figure 3:
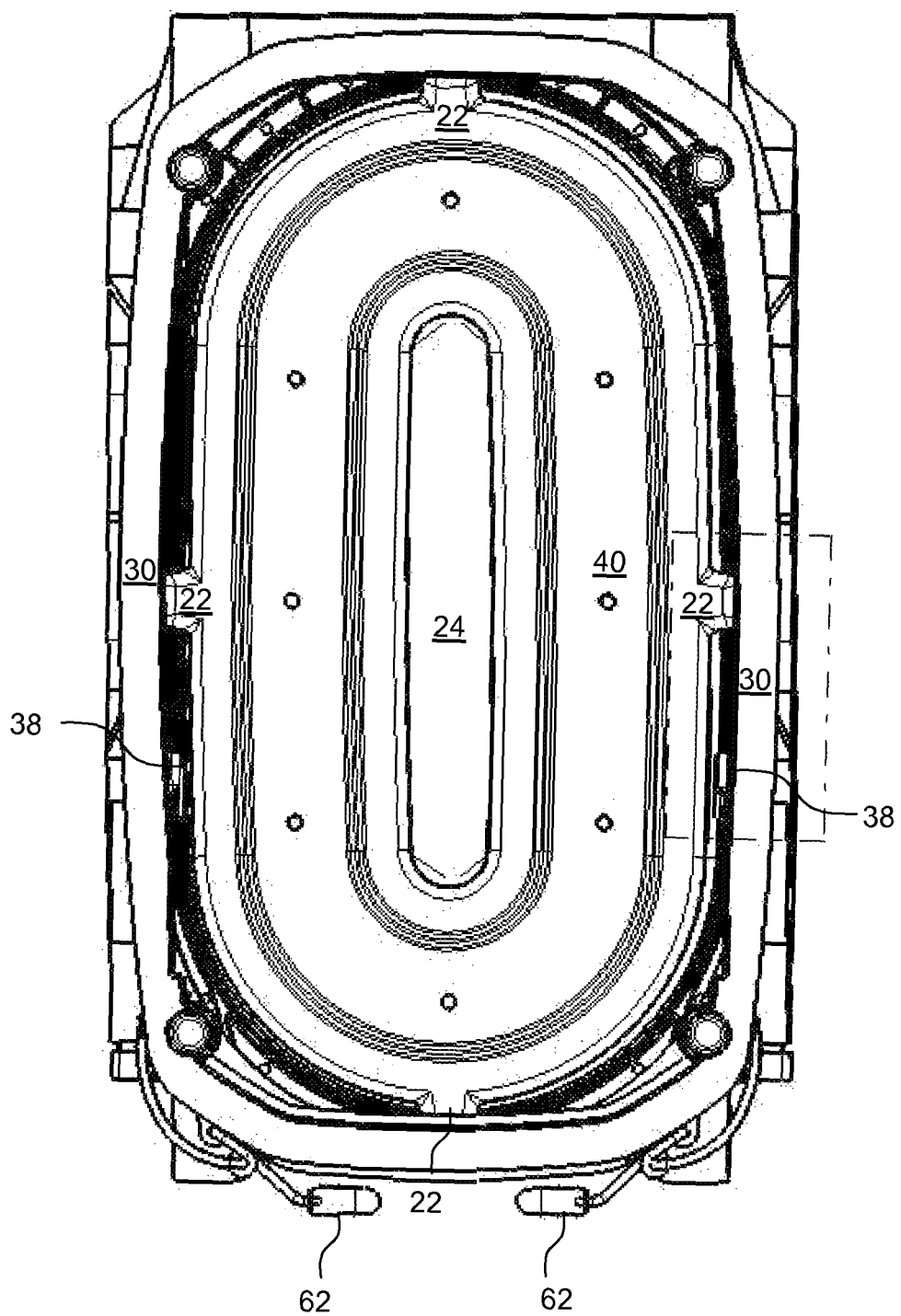
FIG. 3 shows the inlet side of the main filter element of the filter device according to FIG. 1 received in the filter housing.
Figure 4:
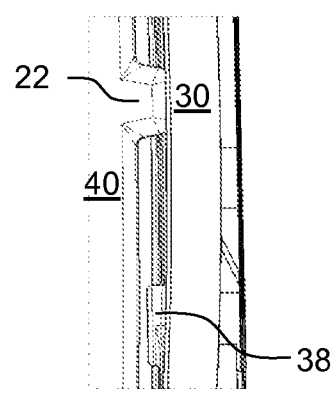
FIG. 4 shows a detail view of the inlet side of FIG. 3, wherein in particular a retaining element of the main filter element and a projection of the filter housing are illustrated.
Figure 5:
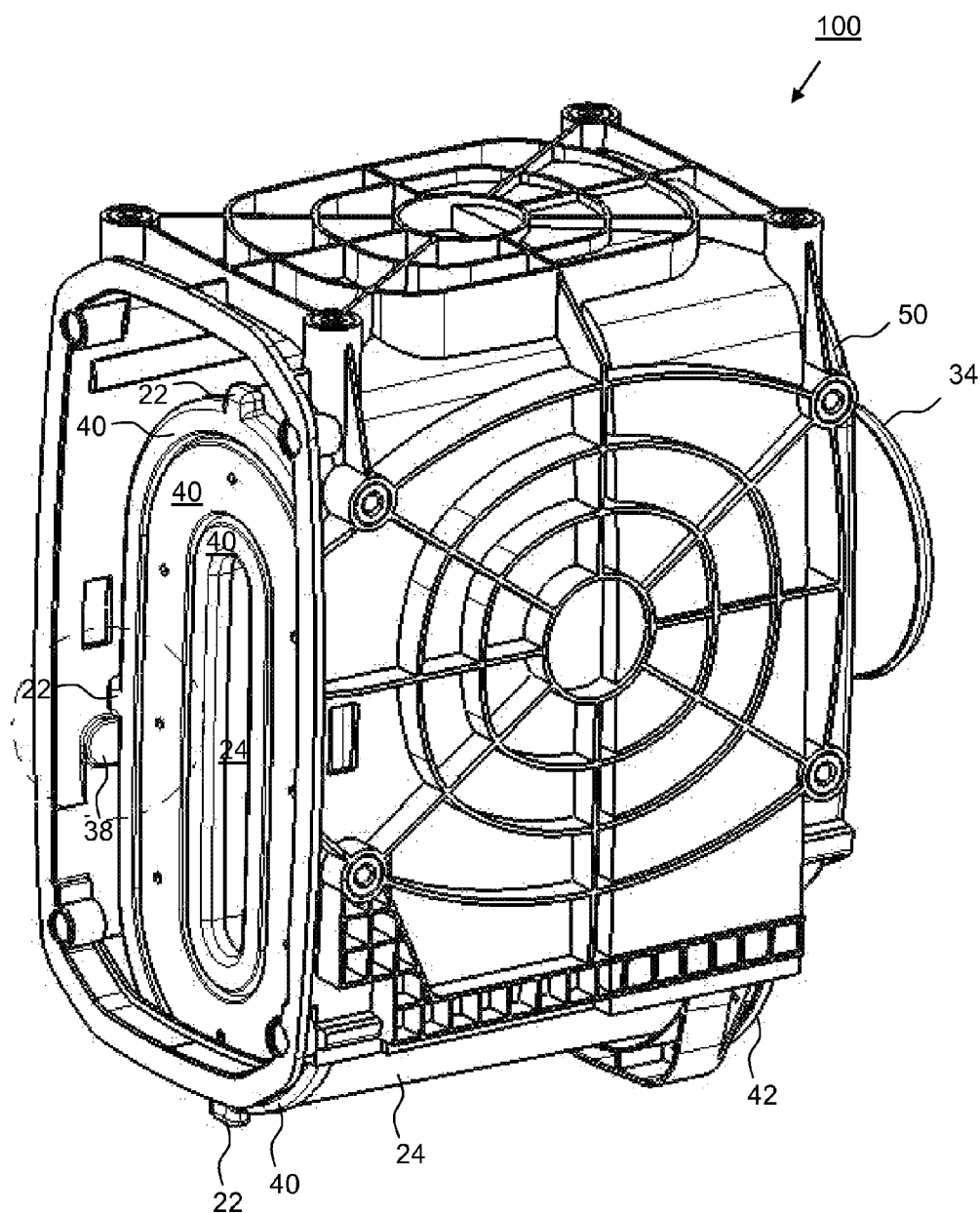
FIG. 5 shows in perspective illustration the filter device of FIG. 1 upon removal of the main filter element.
Figure 6:
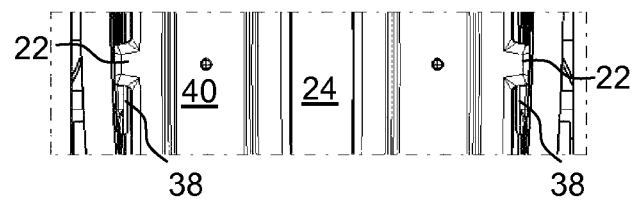
FIG. 6 shows a detail view of the filter device of FIG. 5 wherein in particular the retaining elements that are resting of the projections of the filter housing are illustrated.

In FIGS. 3 and 4, the polyurethane knobs 22 are arranged at a spacing to the projections 38 of the filter housing 30. This is so because the FIGS. 3 and 4 show the main filter element mounted in the filter housing. When the cover 30 is open, the main filter element 20 slides in the direction of the opening 36 and the spacer knobs 22 secure the main filter element 20 in the filter housing (compare FIGS. 5 to 8).

Figure 8:
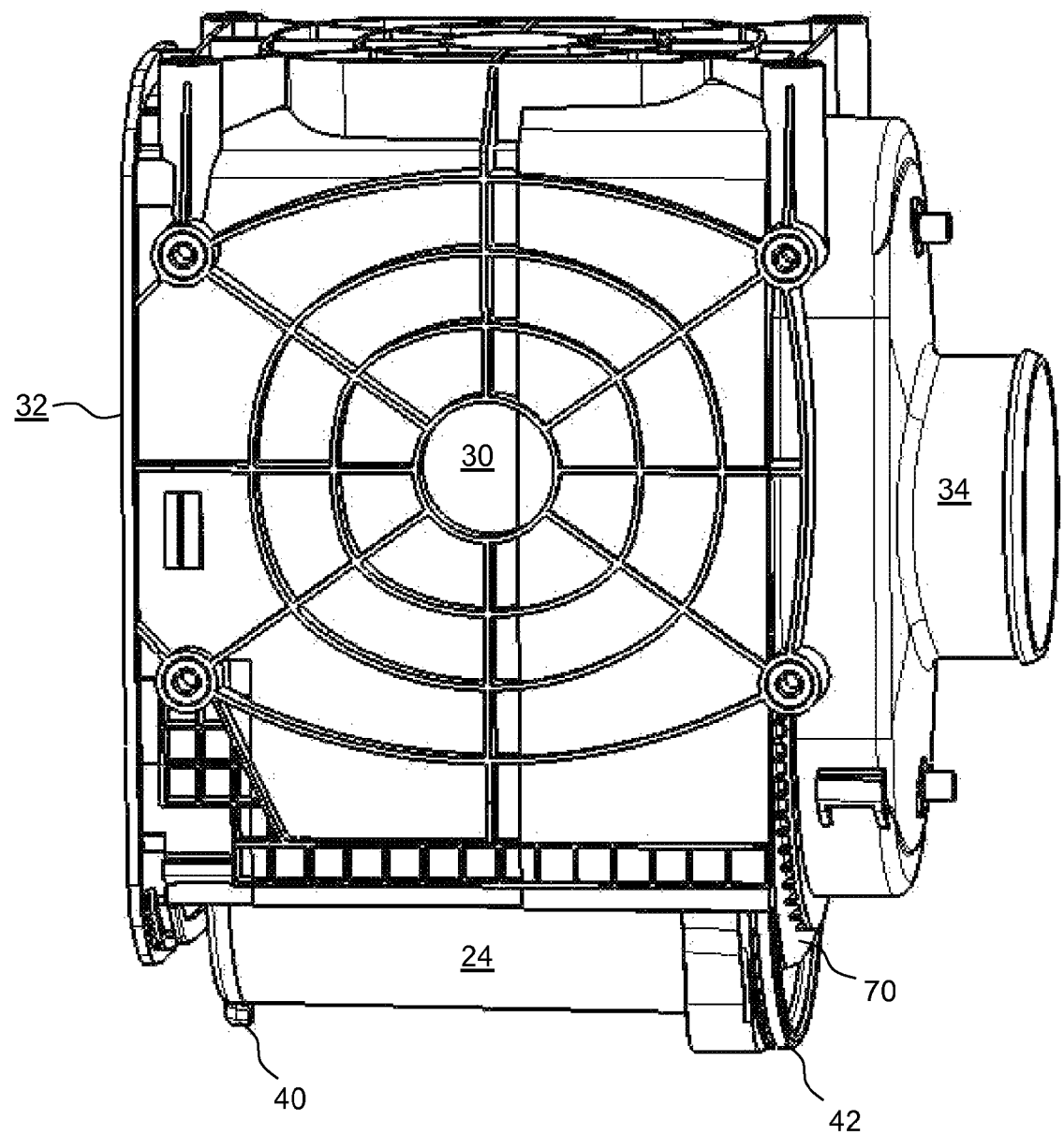
FIG. 8 show a side view of the filter device of FIG. 1 upon removal of the main filter element.

FIG. 8 shows a side view of the filter device 100 when removing the primary element 20. A sealing element 42 at the outlet side is positioned in the sealing seat 70 of the clean-side outlet 34 of the filter housing 30, in such a way that the raw side is separated from the clean side. The filter element 20 is prevented from falling out of the filter housing 30 by the two polyurethane knobs 22 that are arranged at the inflow-side sealing element 40 that are caught on the projections 38 of the filter housing 30 and the outlet-side sealing element 42 that is resting against the sealing seat 70. The polyurethane knobs 22 that serve for stabilizing the main filter element 20 in the filter housing 30 serve thus additionally as a protection from falling out and secure the main filter element 20 against accidental sliding out of the filter housing 30.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. An air filter device for separating liquid and/or solid particles from a gas stream to be purified, comprising:
   a filter housing (30);
   an inflow-side front attachment (10) secured to an inflow-aside of said housing (30);
   a main filter element (20) replaceably received within said filter housing in the flowing gas stream and separates the particles from the gas stream in that the main filter element guides the particles through at least one filter medium (24);
   wherein the filter housing (30) comprises a raw-side inlet (32) connected to the inflow-side front attachment (10) and a clean-side outlet (34) for a purified gas stream to exit said housing;
   wherein the main filter element (20) includes at least one retaining element (22) secured at a circumferential side of said main filter element (20), said at least one retaining element (22) beginning at the circumferential side of the main filter element (20) extends radially outwardly in a direction toward said filter housing (30),
   wherein said at least one retaining element (22) extending outwardly positions the main filter element (20) at a defined spacing relative to the filter housing (30) by abutting against an interior of said filter housing (30) for stabilizing filter element position in said filter housing (30),
   wherein said filter housing (30) at circumferential side of the filter housing includes a openable/closeable opening (36) in a bottom wall of the filter housing (30) that is configured for removal of said main filter element (20) from said filter housing (30) or for radial insertion of said main filter element (20) through said bottom wall into a receiving space within said filter housing (30), and
   wherein opposing interior sidewalls of said filter housing (30) have at least one radially inwardly extending projection (38) that, beginning at a respective one of said interior sidewalls, protrudes inwardly into said receiving space in a direction toward said main filter element (20),
   wherein said at least one retaining element (22) of said filter element supportively engages against a respective one of said at least one radially inwardly extending projection (38) of said housing, said engagement on a side of said at least one radially inwardly extending projection (38) facing away from said openable/closeable opening (36) in said bottom wall such that said main filter element (20) is supported on said at least one radially inwardly extending projection (38), and said at least one radially inwardly extending projection (38) is arranged between said at least one retaining element (22) and said openable/closeable opening (36) in said bottom wall of said filter housing (30),
   wherein, when said opening (36) is open, said at least one inwardly extending projection (38) of said filter housing engages with said at least one retaining element (22) thereby supporting said filter element (20) and preventing said main filter element (20) from falling out of said filter housing (30) through said opening (36) in said bottom wall.

2. The air filter device according to claim 1, wherein said at least one projection (38) of said filter housing (30) is at least two projections (38) that are substantially positioned opposite each other or positioned obliquely opposite each other, and/or
wherein said at least one retaining element (22) of said main filter element (20) is at least two retaining elements (22) that are substantially positioned opposite each other or positioned obliquely opposite each other.

3. The air filter device according to claim 1, wherein said retaining element (22) is formed of an material selected from the set consisting of: an elastic polyurethane material, or a non-polyurethane elastic material.

4. The air filter device according to claim 1, wherein an inflow side of said main filter element (20) on that is facing said raw-side inlet (32) of said filter housing (30) includes a sealing element (40) surrounding the main filter element (20), and
wherein said retaining element (22) is arranged on the circumferential side of the sealing element (40).

5. The air filter device according to claim 4, wherein said sealing element (40) is formed of an material selected from the set consisting of: an elastic polyurethane material, or a non-polyurethane elastic material.

6. The air filter device according to claim 1, wherein said at least one filter medium (24) of said main filter element (20) is an annular star-shaped folded filter medium (24).

7. The air filter device according to claim 1, wherein said main filter element (20) is at least one compact air filter having a plurality of axially arranged parallel filter passages that are alternatingly closed in an area of inlet-side and outlet side end surfaces.

8. The air filter device according to claim 1, wherein said main filter element (20) is at least one multi-bellows filter of two or more radially nested annular filter bellows arranged to have said gas stream to flow through said nested filter bellows in parallel.

9. The air filter device according to claim 1, wherein said inflow-side front attachment is embodied as a cyclone preseparator, protective screen, induction pipe, or raw air conduit.

10. The air filter device according to claim 9, wherein said front attachment is embodied as said cyclone preseparator (10) that separates in a first stage the particles from the gas stream, the cyclone preseparator rotating the gas stream separating the particles.

11. The air filter device according to claim 10, wherein said cyclone preseparator (10) is a multi-cell cyclone that comprises for prepurification of the gas stream a plurality of guide vanes that cause the gas stream to rotate.

12. A main filter element (20) for installation into the filter device according to claim 1, comprising:
a compact air filter medium including
a plurality of air flow passages that are closed alternatingly proximate to inlet-side and outlet-side end surfaces and are formed by alternating placement of flat and corrugated layers;
wherein said main filter element (20) includes at least one retaining element (22) of an elastic material, secured at a circumferential side of said main filter element (20), said at least one retaining element (22) beginning at the circumferential side of the main filter element (20) extends radially outwardly away from said circumferential side, said at least one retaining element (22) for stabilization of position of said main filter element in a filter housing (30) into which said main filter element (20) installs,
wherein said at least one retaining element (22) extending outwardly positions the main filter element (20) at a defined spacing relative to the filter housing (30) by abutting against an interior of said filter housing (30) for stabilizing filter element position in said filter housing (30),
wherein said at least one retaining element (22) of said main filter element (20) is at least two retaining elements (22) that are substantially positioned opposite each other at opposing sides of said main filter element (20), said least two retaining elements (22) configured to engage inwardly extending projections (38) of said filter housing, supportively preventing the main filter element (20) from falling out of the filter housing (30).

13. A main filter element (20) for installation into the filter device according to claim 1, comprising:
a single or multi-bellows filter medium with an annularly closed, zigzag-folded filter bellows;
wherein said annular filter bellows are radially nested with a larger annular filter element arranged about a smaller annular filter element,
wherein said main filter element (20) includes at least one retaining element (22) of an elastic material secured at a circumferential side of said main filter element (20), said at least one retaining element (22) beginning at the circumferential side of the main filter element (20) extends radially outwardly away from said circumferential side, said at least one retaining element (22) for stabilization of position of said main filter element in a filter housing (30) into which said main filter element (20) installs,
wherein said at least one retaining element (22) extending outwardly positions the main filter element (20) at a defined spacing relative to the filter housing (30) by abutting against an interior of said filter housing (30) for stabilizing filter element position in said filter housing (30),
wherein said at least one retaining element (22) of said main filter element (20) is at least two retaining elements (22) that are substantially positioned opposite each other at opposing sides of said main filter element (20), said least two retaining elements (22) configured to engage inwardly extending projections (38) of said filter housing, supportively preventing the main filter element (20) from falling out of the filter housing (30).

14. The air filter device according to claim 1, wherein
said at least one projection (38) of said filter housing (30) is at least two projections (38) that are substantially positioned opposite, each on a respective one of said opposing sidewalls,
wherein said at least one retaining element (22) of said main filter element (20) is at least two retaining elements (22) that are substantially positioned opposite each other at opposing sides of said main filter element (20),
wherein, when said openable/closeable opening (36) is closed by a removable cover, said retaining elements (22) of said main filter element (20) are spaced apart from a respective engageable projection (38) of said filter housing (30),
wherein when said opening is closed by said cover, said filter element slides within the filter housing in direction of said openable/closeable opening (36), engaging said retaining elements (22) against said inwardly extending projections (38) of said filter housing, preventing the main filter element (20) from falling out of the filter housing (30).

* * * * *